Sept. 16, 1958          W. H. CLARK, JR          2,851,905
MULTIPLE DIFFERENTIAL GEARING
Filed March 19, 1956

INVENTOR
WILLIAM H. CLARK JR.
BY
Godfrey B. Speir
ATTORNEY

United States Patent Office 2,851,905
Patented Sept. 16, 1958

2,851,905
MULTIPLE DIFFERENTIAL GEARING

William H. Clark, Jr., Rutherford, N. J., assignor to Curtiss-Wright Corporation, a corporation of Delaware Application March 19, 1956, Serial No. 572,461

13 Claims. (Cl. 74—675)

This invention relates to epicyclic gearing. More particularly, the invention provides novel arrangements and mountings for epicyclic gearing, adapting such gearing for mechanical control mechanisms wherein it is desired to combine two or more motions or positions, to produce one or more output motions or positions.

The present invention enables the stacking of gear elements, having common mounting provisions, in a large number of different arrangements. It enables all inputs and outputs to be fed into and derived from exposed components of the stacked elements.

An object of the invention is to provide a single, stacked gearing assembly, having plural inputs and outputs. A further object is to provide gearing elements adapted for stacking into an assembly in different and various combinations. A further object is to provide a novel bearing, aligning and spacing arrangement for the components of a stacked gearing assembly.

Figure 1:
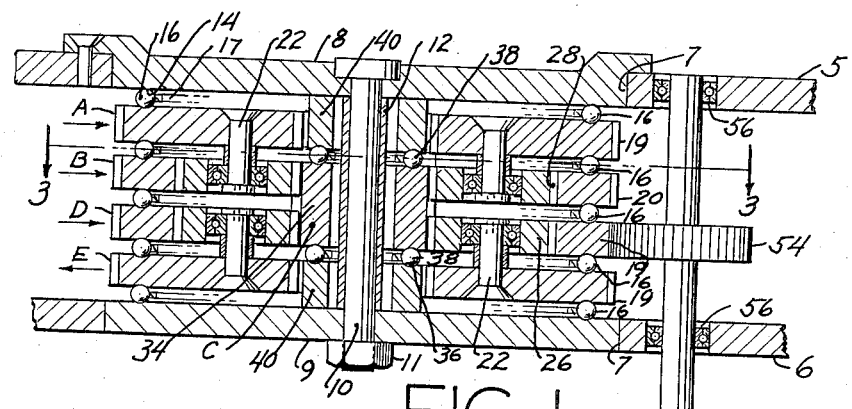
Figure 2:
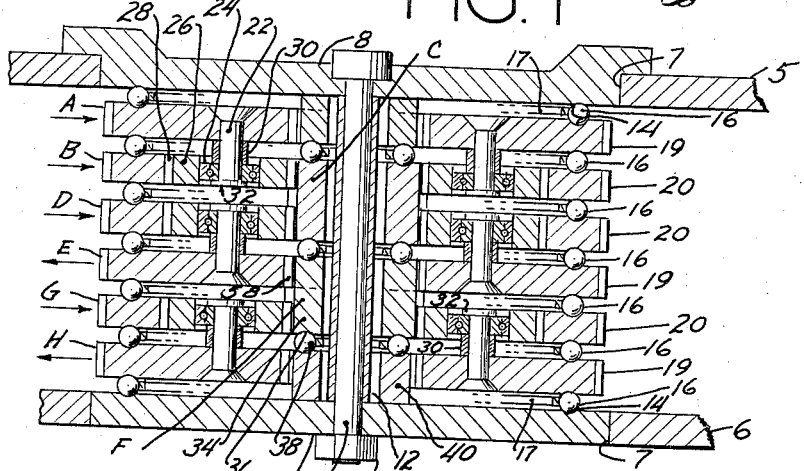
Figure 3:
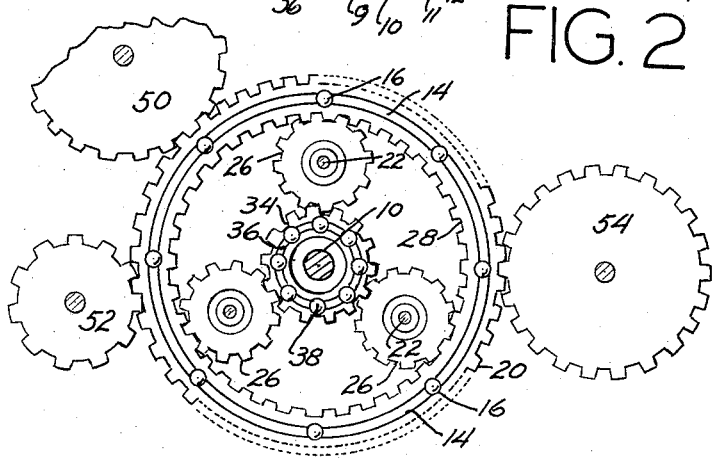

Other objects of the invention will become apparent as the following detailed description is read in connection with the attached drawings. In these drawings, wherein similar reference characters designate similar parts, Fig. 1 is a section through a gearing assembly according to the invention, Fig. 2 is a section through an alternative gearing assembly, and Fig. 3 is a section, in part, on the line 3—3 of Fig. 1.

While the teachings and arrangements of the invention are applicable to gearing systems of any size, their particular utility lies in the field of small, low-power control and instrument mechanisms.

It may be assumed for the examples shown, that the mechanisms in the figures are several times as large as they would be in actual practice.

The gearing assembly is adapted to be disposed between two spaced mounting plates 5 and 6, each having a hole 7 therein to receive end plates 8 and 9 of the gear assembly. The plates are secured to one another by a bolt 10 having a nut 11, the bolt between the end plates having a spacing sleeve 12 to hold the plates a desired distance apart. Each plate 8 and 9, on its inner surface, is formed with an annular bearing groove 14, on which bearing balls 16, held by a retainer 17, may roll. Flat spur gears 19, having annular bearing grooves in their side faces, like grooves 14, engage the bearing balls. Flat ring gears 20, having annular bearing grooves in their side faces like grooves 14 may be placed between the spur gears 19 and are spaced therefrom and journalled for rotation relative thereto by additional sets of bearing balls 16 held by retainers 17.

Any combination of spur gears 19 and ring gears 20 may be stacked between end plates 8 and 9, with bearing balls 16 therebetween. These gears are all relatively rotatable and are securely held and spaced by the balls, through their engagement with the annular race grooves 14.

The flat spur gears 19 are usually spider gears, carrying journal elements 22 on which small ball bearings 24 are secured, the ball bearings 24 providing a mounting for planet pinions 26. The latter are assembled to engage the internal teeth 28 of ring gears 20. Each journal element 22 preferably comprises a rivet embraced by a spacer sleeve 30 against which the inner race of ball bearing 24 seats, the end of the rivet being headed as at 32 to hold the bearing on the element 22. The pinions 26 may be snugly fitted on the outer races of bearings 24 and the pinion bores may be stacked or have spring ring retainers (not shown) to hold the pinions and bearings in the desired axial relation. Alternatively, the outer races of ball bearings 24 may be formed integrally as grooves in the bores of pinions 26.

The teeth of planet pinions 26 engage a sun gear 34. Each sun gear is preferably of a length representing the sum of the thicknesses of gears 19 and 20 plus the spacing between said gears; it is convenient to make gears 19 and 20 the same thickness. Each sun gear has a bore larger than the diameter of spacer sleeve 12 and is clear of contact therewith. Each sun gear also has an annular race groove 36 on each end, engaged by retained balls 38 which are preferably of the same size as balls 16. Thus, sun gears 34 may be stacked in end-to-end relation. Sun gear stacks are journalled on additional balls 38 running on annular grooves 36 on the ends of spacer pillars 40 engaging and located by the end plates 8 and 9.

By this construction, the sun gears are journalled for rotation independently of one another, and independently of the rotation of the gears 19 and 20.

The foregoing description has dealt with details of construction and mounting of the components rather than with their functional relationship. The components described may be co-related in a number of different ways, of which the arrangements of Figs. 1 and 2 are exemplary. For functional description the components are redesignated by letters; it is to be understood, however, that parts bearing different letters may still be structurally identical as identified by similar reference numbers.

In Fig. 1, spider gear A may comprise an input, and also ring gear B may be an input. The positions or movement of these gears control the position or movement of sun gear C. Ring gear D may comprise another input which cooperates with the movement or position of sun gear C to control the position or movement of spider gear E, which comprises the output element of the system. Thus, the assembly of Fig. 1 comprises three independent inputs, which control the output spider gear E. There are four layers in the "sandwich," each layer being either an output or an input. Each element A, B, D and E is available for drive from or to externally disposed gears such as 50, 52 and 54 shown in Fig. 3, which may be borne in the plates 5 and 6 by suitable bearings 56 (Fig. 1). There is one externally disposed gear for each of the gears A, B, D and E (Figs. 1 and 2) and likewise for gears G and H (Fig. 2). For simplicity, only one such externally disposed gear is shown in Fig. 1, none in Fig. 2 and three in Fig. 3.

All the gears 19 and 20 are preferably of the same diameter and number of teeth externally. Also, the ratios of the multiple epicyclic sets are of the same character, since all sun gears planet pinions and ring gears are like one another. Desired input and output drive ratios and relationships are established by the diameters of gears 50, 52 and 54 and by the ratios of other external gearing associated therewith.

The characteristic ratios of epicyclic gearing are, of course, well known, and follow these rules:

$$N_s = N_p\left(1 + \frac{R}{S}\right) - N_r\frac{R}{S}$$

$$N_p = N_s\left(\frac{S}{S+R}\right) + N_r\left(\frac{R}{S+R}\right)$$

$$N_r = N_p\left(1\frac{S}{R}\right) - N_s\frac{S}{R}$$

wherein $N_s$, $N_p$ and $N_r$ are the speeds of the sun, planet-carrying and ring gears respectively, and $s$ and $r$ are the tooth numbers of the sun and ring gears respectively.

Convenient ratios of the gears may be chosen wherein, for instance, $R/S$ is 3 or 4, which brings the relationship of $N_s$, $N_p$ and $N_r$ into simple fractions or decimals which are easily manipulated in connection with other gearing ratios. The rotational direction of the different inputs may be chosen to sum speeds or positions, or to secure speed or position differences.

In the assembly of Fig. 2, components A, B, C and D are the same as in Fig. 1, wherein spider gear E may comprise an output element. However, this spider gear may be splined at its bore as at 58 in complement to the teeth of a sun gear element F and is assembled in direct driving relation therewith.

The sun gear F then becomes another input to an epicyclic train comprising the ring gear G and a spider gear H, one of which comprises another input to the system, and the other, another output. Accordingly, the arrangement of Fig. 2 provides 4 independent inputs, one whose movement or position is a function of all four inputs, and another output whose movement or position is a function of the relationship of three of the inputs.

From Fig. 2, it will be seen that additional components F, G and H may be stacked, to provide an additional input and an additional output for each such addition.

Many other combinations are possible, as will be apparent to the skilled designer, to build up desierd numbers of input and output components and to add or subtract the motion or positions thereof.

The convenient and simple gearing components and arrangements shown produce a most useful mechanism having the feature of primary reliability and positive drive inherent in well-designed mechanical devices. This feature is most useful in control equipment for aircraft prime movers and the like.

Therein, failure of controls can have catastrophic consequences, and clearly, apparatus having anything less than primary reliability is intolerable.

While I have shown and described my invention in a presently preferred embodiment, it is clear that modifications and changes may be made without departing from the spirit of the invention. Reference should be had to the following claims for definitions of the limits and scope of the invention.

I claim:

1. A stacked gear assembly comprising a stack of coaxial spur gears some comprising ring gears and others comprising spiders each having an annular race groove on each side thereof, said grooves being of the same diameter which is slightly less than the external diameter of said gears, bearing balls between adjacent gears and fitted in said grooves, whereby said gears are rotatable independently and are held in their coaxial relation by the engagements of said balls in said grooves, planetary gearing elements including sun gears drivably connecting each coaxial spur gear with its adjacent spur gear, a plurality of spur gears some being input and others being output gears, each engaging one of said coaxial spur gears, and means to hold said coaxial spur gears in assembled relation.

2. A stacked gear assembly comprising a stack of coaxial spur gears some comprising ring gears and others comprising spiders each having an annular race groove on each side thereof, said grooves being of the same diameter which is slightly less than the external diameter of said gears, bearing balls between adjacent gears and fitted in said grooves, whereby said gears are rotatable independently and are held in their coaxial relation by the engagements of said balls in said grooves, planetary gearing elements including sun gears drivably connecting each coaxial spur gear with its adjacent spur gear, a plurality of spur gears some being input and others being output gears, each engaging one of said coaxial spur gears, said planetary gearing elements including planet pinions secured for rotation on certain of said coaxial spur gears, and another of said coaxial gears being formed as an internal gear having teeth engaged by said planet pinions, and means to hold said coaxial spur gears in assembled relation.

3. A stacked gear assembly comprising a stack of coaxial spur gears some comprising ring gears and others comprising spiders each having an annular race groove on each side thereof, said grooves being of the same diameter which is slightly less than the external diameter of said gears, bearing balls between adjacent gears and fitted in said grooves, whereby said gears are rotatable independently and are held in their coaxial relation by the engagements of said balls in said grooves, planetary gearing elements including sun gears drivably connecting each coaxial spur gear with its adjacent spur gear, a plurality of spur gears, some being input and others being output gears, each engaging one of said coaxial spur gears, said planetary gearing elements including planet pinions secured for rotation on certain of said coaxial spur gears, and another of said coaxial gears being formed as an internal gear having teeth engaged by said planet pinions, said planetary gearing elements including a sun gear disposed between and having teeth engaged by said planet pinions, means drivably connecting said sun gear with another of said coaxial spur gears, means to support and bear said sun gear in coaxial relation with said coaxial spur gears, and means to hold said coaxial spur gears in assembled relation.

4. A stacked gear assembly comprising a stack of coaxial spur gears each having an annular race groove on each side thereof, said grooves being of the same diameter which is slightly less than the external diameter of said gears, bearing balls between adjacent gears and fitted in said grooves, whereby said gears are rotatable independently and are held in their coaxial relation by the engagements of said balls in said grooves, planetary gearing elements drivably connecting each spur gear with its adjacent spur gear, a plurality of spur gears some being input and others being output gears, each engaging one of said coaxial spur gears, said planetary gearing elements including planet pinions secured for rotation on certain of said coaxial gears, and another of said coaxial gears being formed as an internal gear having teeth engaged by said planet pinions, a sun gear disposed between and having teeth engaged by said planet pinions, means drivably connecting said sun gear with another of said coaxial gears, means to support and bear said sun gear in coaxial relation with said coaxial gears, said supporting means comprising annular elements in end-to-end relation with said sun gear and coaxial therewith, the ends of said elements and sun gear having facing annular grooves, bearing balls between facing ends and rolling in said grooves, and means to hold said coaxial spur gears in assembled relation.

5. A gearing assembly comprising a plurality of flat coaxial rings stacked upon one another with bearing balls therebetween, said rings having annular grooves for said balls on opposite faces thereof close to the ring edges, means to hold said rings including annularly grooved end plates and bearing balls between the end plate grooves and the grooves of end rings, whereby the stack of rings are held in said coaxial relation and are free to rotate relative to one another, means engaging the peripheries of respective rings establishing driving engagement with each of them, and means wholly within respective said rings drivably connecting each ring with an adjacent ring.

6. A gearing assembly comprising a plurality of flat coaxial rings stacked upon one another with bearing balls therebetween, said rings having annular grooves for said balls on opposite faces thereof close to the ring edges, means to hold said rings including annularly grooved end plates and bearing balls between the end plate grooves and the grooves of end rings, whereby the stack of rings are held in said coaxial relation and are free to rotate relative to one another, means engaging the peripheries of respective rings establishing driving engagement with each of them, and means wholly within respective said rings drivably connecting each ring with an adjacent ring, said latter means comprising epicyclic spur gearing.

7. A gearing assembly comprising a plurality of flat coaxial rings stacked upon one another with bearing balls therebetween, said rings having annular grooves for said balls on opposite faces thereof close to the ring edges, means to hold said rings including annularly grooved end plates and bearing balls between the end plate grooves and the grooves of end rings, whereby the stack of rings are held in said coaxial relation and are free to rotate relative to one another, means engaging the peripheries of respective rings establishing driving engagement with each of them, means wholly within respective said rings drivably connecting each ring with an adjacent ring, said latter means including planet pinions journalled on one of said rings, another of said rings comprising an internal gear having teeth engaged by the teeth of said planet pinions, and another of said rings comprising a sun gear having teeth engaged by the teeth of said planet pinions.

8. A gearing assembly comprising an end plate having an annular groove on one surface thereof, balls rollable in said groove, a flat ring having annular grooves on opposite sides thereof, these and subsequently recited grooves having the same diameter of said plate groove, the groove on one side of said ring engaging said balls, additional annularly grooved rings stacked on said first ring with bearing balls between rings and engaging said grooves, one of said rings comprising an internally toothed ring gear supported relative to said other rings by said bearing balls, another ring having planet pinion journals and planet pinions mounted thereon the pinions engaging said ring gear, and sun gear means within and concentric with said rings establishing a driving connection between said planet pinions and another of said rings.

9. A gearing assembly according to claim 8, including external driving connections to said rings.

10. A gearing assembly according to claim 8, wherein said rings are externally similarly toothed to comprise gears, and external gears drivably engaged with said toothed rings.

11. A gearing assembly comprising a plurality of superimposed coaxial rings secured between end supports, annular rows of bearing balls between successive rings enabling the rings to rotate freely relative to said supports and to one another, said rings and supports having substantially similar annular races for engagement by respective rows of bearing balls, one of said rings being formed as an internal gear, another being formed as a spider, a planet pinion journalled on the spider and engaging the teeth of said ring gear, a sun gear concentric with said rings engaged by said planet pinion, and means securing said sun gear to another of said rings for rotation therewith.

12. A coaxial gearing assembly comprising a plurality of superimposed relatively rotatable coaxial rings secured between supports, differential epicyclic gearing means progressively drivably connecting said rings to one another, there being at least four such rings, three of the four rings comprising input elements and one thereof comprising an output element.

13. A coaxial gearing assembly comprising a plurality of superimposed relatively rotatable coaxial rings secured between supports, differential epicyclic gearing means progressively drivably connecting said rings to one another, there being at least four such rings, three of the four rings comprising input elements and one thereof comprising an output element, and of succeeding sets of two rings, one comprising an input member and the other comprising an output member.

References Cited in the file of this patent

UNITED STATES PATENTS

| | | |
|---|---|---|
| 1,933,644 | Trump | Nov. 7, 1933 |
| 2,370,675 | McCoy | Mar. 6, 1945 |
| 2,629,130 | Rempel | Feb. 24, 1953 |